(12) United States Patent
Wu

(10) Patent No.: US 7,369,182 B2
(45) Date of Patent: May 6, 2008

(54) GENERATING A SCAN VELOCITY MODULATION SIGNAL

(75) Inventor: Chun Hsing Wu, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 549 days.

(21) Appl. No.: 10/532,916

(22) PCT Filed: Oct. 8, 2003

(86) PCT No.: PCT/IB03/04445

§ 371 (c)(1),
(2), (4) Date: Apr. 27, 2005

(87) PCT Pub. No.: WO2004/043057

PCT Pub. Date: May 21, 2004

(65) Prior Publication Data

US 2006/0012717 A1   Jan. 19, 2006

(30) Foreign Application Priority Data

Nov. 4, 2002   (WO) .................... PCT/SG02/00299

(51) Int. Cl.
*H04N 5/21*   (2006.01)

(52) U.S. Cl. ..................................... 348/627; 348/626
(58) Field of Classification Search ............... 348/626, 348/627, 625, 623, 622
See application file for complete search history.

(56) References Cited

U.S. PATENT DOCUMENTS

| | | | | |
|---|---|---|---|---|
| 4,571,511 A | * | 2/1986 | Dischert et al. | 327/312 |
| 5,196,941 A | * | 3/1993 | Altmanshofer | 348/626 |
| 5,528,312 A | * | 6/1996 | No et al. | 348/626 |
| 6,148,116 A | * | 11/2000 | Park et al. | 382/266 |

FOREIGN PATENT DOCUMENTS

GB   064911 A   10/1979

* cited by examiner

*Primary Examiner*—M. Lee

(57) ABSTRACT

The processing unit (1) for generating a scan velocity modulation signal (DS) has an input for receiving a video signal (VS) and an output for supplying a modulation signal (DS). The unit (1) comprises a series connection of, successively, a coring circuit (C), a differentiator (D), and a limiter (L). The display device (16) comprises a cathode ray tube (10) and the processing unit (1).

10 Claims, 3 Drawing Sheets

GENERATING A SCAN VELOCITY MODULATION SIGNAL

The invention relates to a processing unit for generating a scan velocity modulation signal the processing unit having an input for receiving a video signal and an output for supplying the modulation signal, the invention also relates to a display device comprising a cathode ray tube having means for modulating a scan velocity of an electron beam, and to a method of generating a scan velocity modulation signal.

An embodiment of such a unit is known from GB 2 064 911 A. In the known unit, the video signal is differentiated and then supplied to circuitry which performs coring as well as limiting. When the modulation signal is applied to a scan velocity modulation coil of a cathode ray tube, the obtained sharpness improvement is not optimal because of the presence of noise with a relatively large amplitude. The known display device includes the known processing unit and a cathode ray tube. The known method of generating the modulation signal includes the steps of subjecting the video signal to the successive steps of differentiating, coring and limiting the amplitude. It is a disadvantage of the known unit that noise with a relatively large amplitude is present in the modulation signal.

It is an object of the invention to provide a modulation signal wherein noise is suppressed to a large extent. The invention is defined by the independent claims. The dependent claims define advantageous embodiments.

The object is realized in that the series connection comprises, successively from the input to the output, the coring circuit, the differentiator, and the limiter. The high frequency noise components present in the video signal with an amplitude below the threshold of the coring circuit are substantially removed from the video signal in the coring circuit. Consequently, these removed components are not enhanced by the subsequent differentiation. When applying the video signal to the coring circuit before differentiation, the low frequency components with an amplitude larger than the threshold are not removed by the coring circuit and remain present in the modulation signal. In the known unit, the differentiator reduces the amplitudes of most low frequency components to a level below the threshold, so the subsequent coring circuit substantially removes these components from the video signal. Consequently, an additional advantage of the processing unit according to the invention is that the low frequency components remain present in the modulation signal to provide scan velocity modulation.

The coring circuit may comprise a diode circuit comprising a first diode and a second diode coupled anti-parallel, a cathode of the first diode being coupled to an anode of the second diode. By supplying the video signal via this diode circuit to the differentiator, the desired coring is obtained in a very cost-effective way. The forward voltage of the diodes determines the threshold of the coring circuit.

The differentiator may comprise a first capacitor, which is coupled in series with the diode circuit. This is a cost-effective way of realizing the differentiator. Moreover, when the coring circuit and the differentiator are coupled in series, the coring circuit still prevents the components with an amplitude below the threshold from reaching the differentiator.

It is advantageous if the amplifier has a transistor having a control terminal as a negative input, a first main terminal as the positive input, and a second main terminal as an amplifier output. This amplifier has a low input impedance, which is required to achieve adequate differentiation via the capacitor.

The limiter may comprise a series connection of another capacitor and another diode circuit comprising a third diode and a fourth diode, the series connection being coupled between a second reference voltage source and the amplifier output. The forward voltage of the diodes determines the maximum amplitude of the modulation signal, being the output voltage of the limiter.

It is advantageous if the diodes are zener diodes. The desired limiting threshold can be selected by choosing zener diodes with a zener voltage substantially equal to the desired threshold.

It is advantageous if a converter is present for converting the modulation signal into a drive current for the means for modulating the scan velocity; an input of the converter is coupled to the output of the unit; and an output of the converter is coupled to the means for modulating the scan velocity. The converter converts, for example, the modulation signal, being a voltage, into a current proportional to the modulation signal. This current is supplied to the means for modulating the scan velocity, usually being a coil mounted on the cathode ray tube. The current through the coil influences the speed of the deflection of the electron beam of the cathode ray tube.

These and other aspects of the invention are apparent from and will be elucidated with reference to the drawings, in which.

Equivalent elements in the Figures have been given the same reference numerals.

Figure 1:
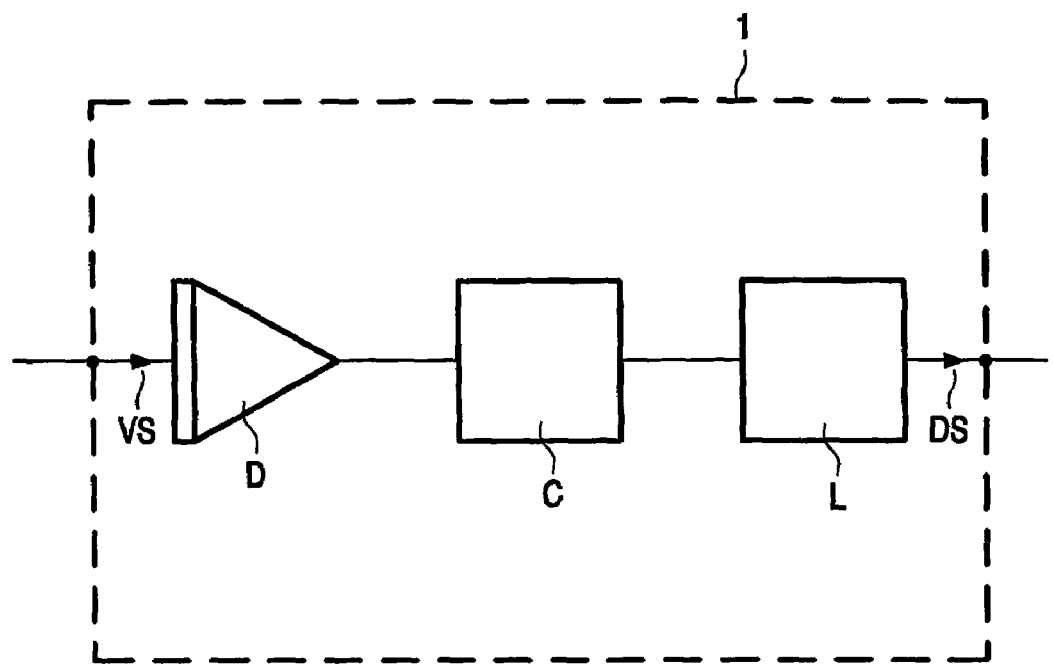
FIG. 1 shows a block diagram of the processing unit according to the prior art.

The prior-art processing unit 1 for generating a scan velocity modulation signal in FIG. 1 comprises a differentiator D, a coring circuit C and a limiter L, in that order, from the input to the output. The video signal VS at the input of the unit 1 is differentiated by the differentiator D and then applied to a coring circuit C that removes the small amplitude components in the differentiated video signal. As a subsequent step, or simultaneously, the limiter limits the maximum amplitude of the differentiated signal, resulting in the modulation signal DS at the output of the unit 1. After differentiating, the low frequency components of the video signal VS are reduced in amplitude. If the amplitude is reduced below the threshold of the coring circuit C, then these components are removed. Consequently, the modulation signal will not generate the desired scan velocity modulation for these low frequency components. Moreover, the high frequency components of the noise, present in the video signal, are amplified by the differentiator D. This results in undesired, large amplitudes of the high frequency noise components in the modulation signal DS.

Figure 2:
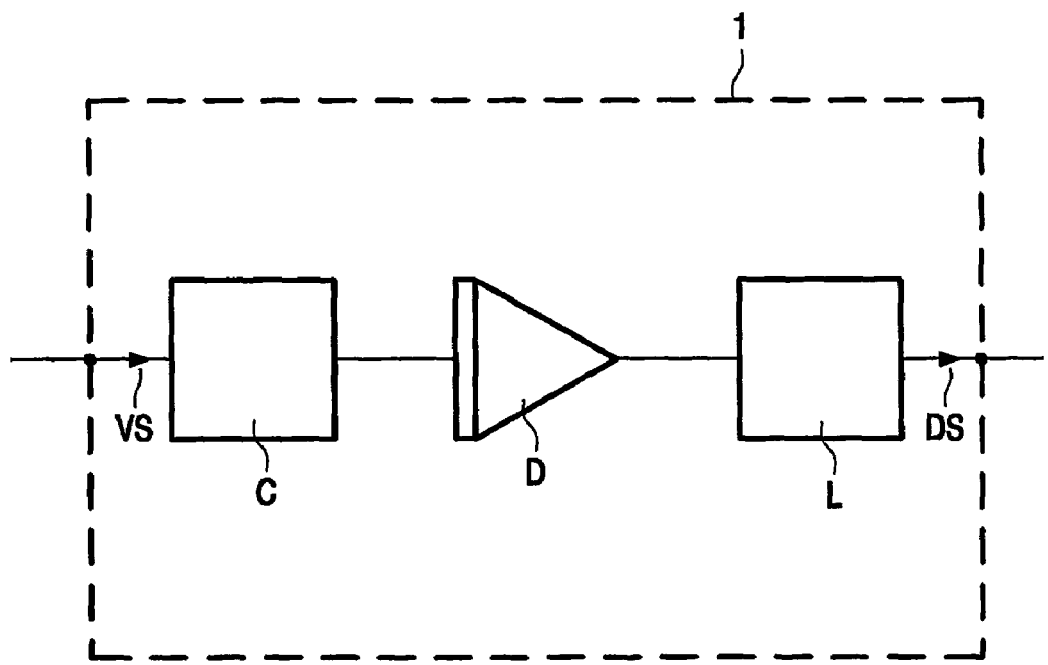
FIG. 2 shows a block diagram of the processing unit according to the invention.

In the unit 1 according to the invention, as shown in FIG. 2, the sequence of the elements is different from the prior art. First, the video signal VS is applied to the coring circuit C. The coring circuit C removes the small amplitude components of the video signal VS below a predetermined threshold. These components have to be removed because applying scan velocity modulation for these components would result in an exaggerated correction of these amplitudes. At the same time any noise, present in the video signal VS, including its high frequency components, is suppressed as long as the amplitude of the noise is below the predetermined threshold. A considerable part of the noise spectrum is located in the upper part of the frequency spectrum of the video signal VS. By removing these high frequency noise components in the coring circuit C, it is avoided that these high frequency components are passed to the next stage. Secondly, the signal coming from the coring circuit C is amplified in the differentiator, which is equivalent to a high-pass filter, resulting in large undesired noise components in the modulation signal DS. Thirdly, the limiter L limits the amplitude of the modulation signal DS to a maximum amplitude, resulting in a modulation signal DS providing adequate scan velocity modulation.

Figure 3:
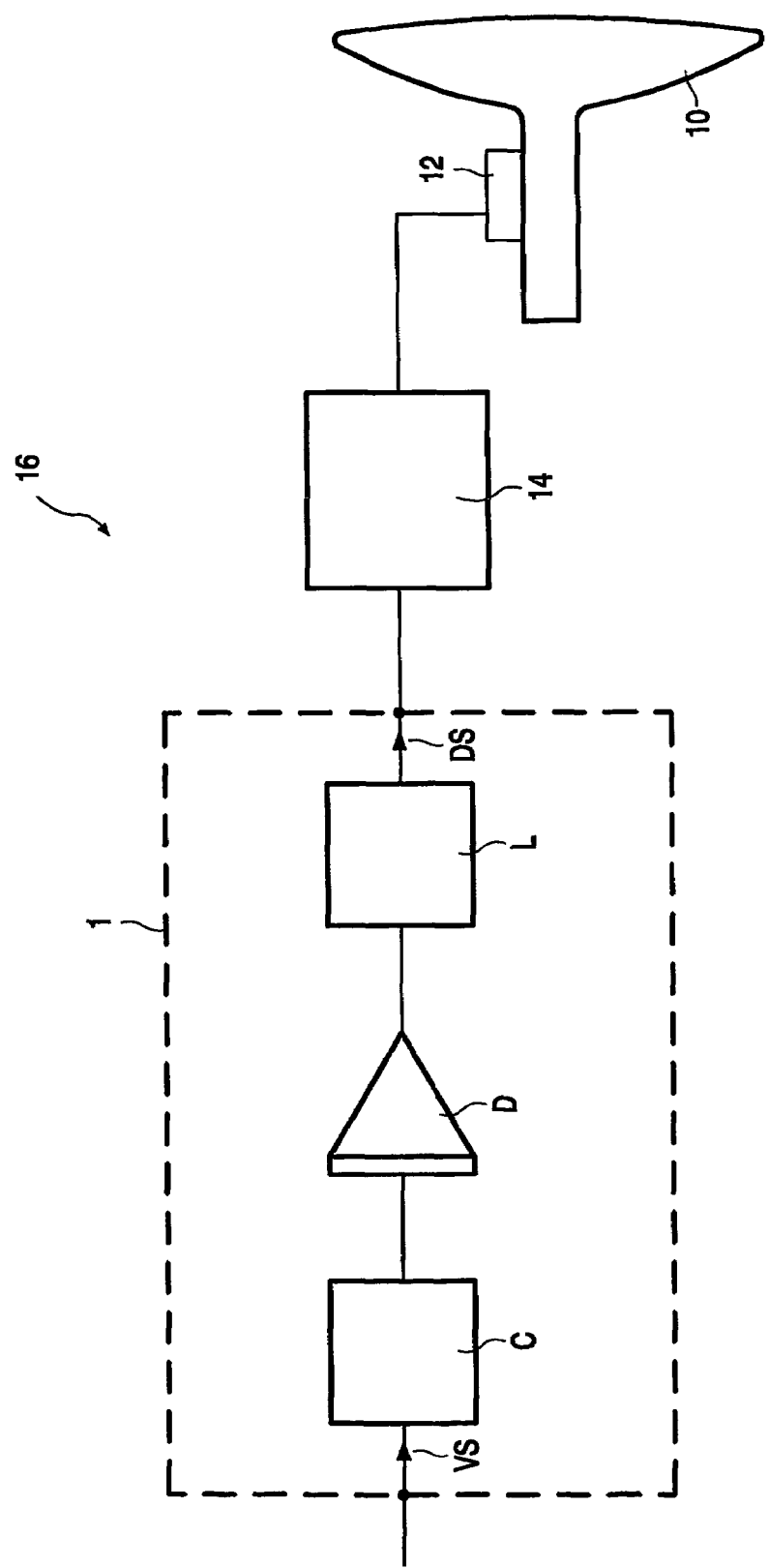
FIG. 3 shows a block diagram of the display device according to the invention.

The block diagram of FIG. 3 shows the processing unit 1 receiving the video signal VS. The unit 1 supplies the driving signal DS to a converter 14. The converter 14 is connected to means 12 for modulating the scan velocity, being, for example, a scan velocity modulation coil 12 mounted on a cathode ray tube 10. If the modulation signal DS is a voltage waveform, the converter 14 converts the modulation signal DS into a current flowing through the coil 12. The current through the coil 12 generates an electromagnetic field, which modulates the velocity of a deflected electron beam in the cathode ray tube 10. If required, the converter 14 also functions as an amplifier/buffer stage for the modulation signal DS.

Figure 4:
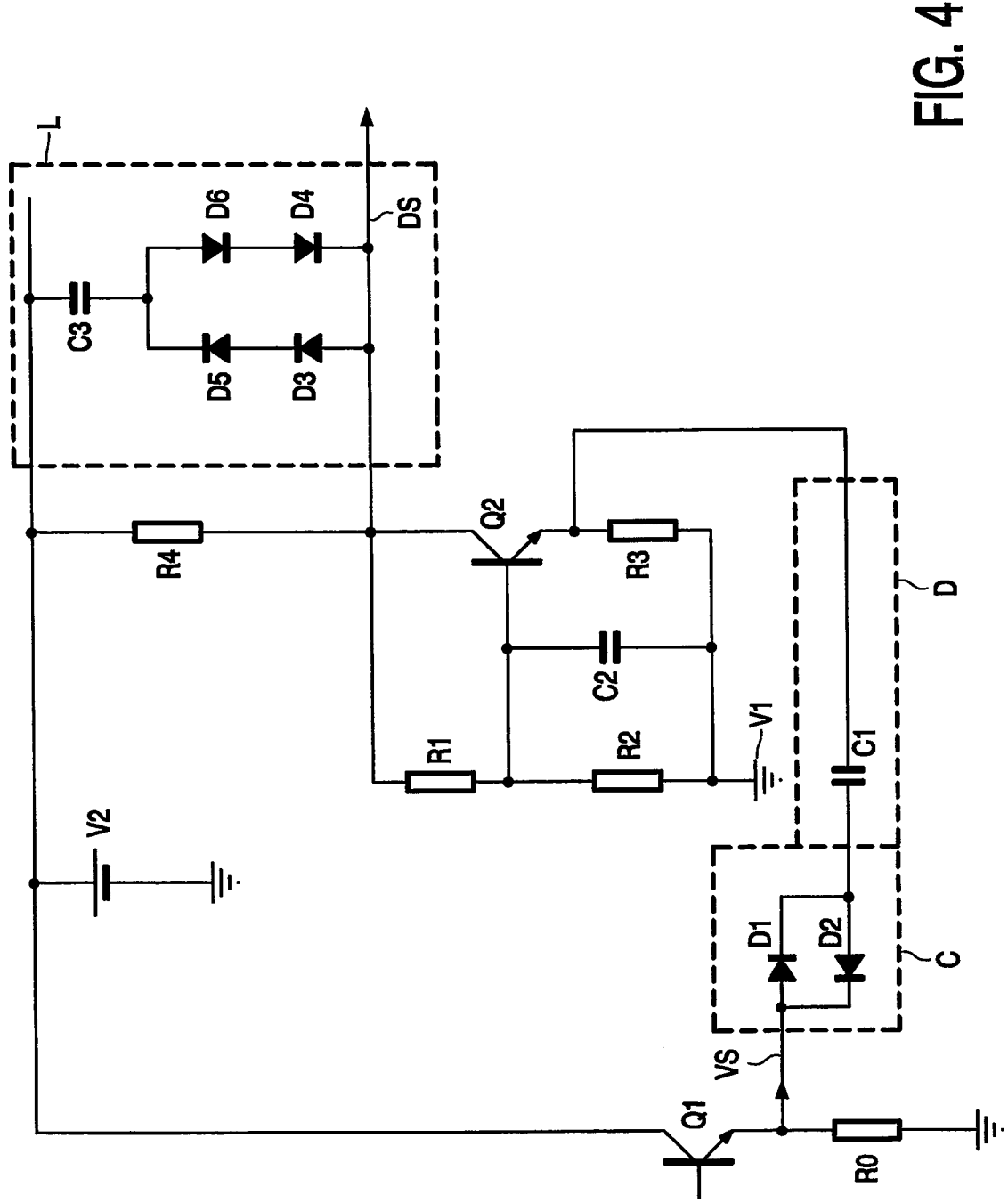
FIG. 4 shows a circuit diagram of a part of the display device according to the invention.

In FIG. 4 the video signal VS is applied to the coring circuit C, comprising two anti-parallel connected diodes D1, D2. The differentiator D, formed by capacitor C1, is connected in series with the coring circuit. The cathode of the first diode D1 is connected to the anode of the second diode D2. If buffering is necessary to provide a low output impedance voltage drive, the video signal VS is supplied to the coring circuit C via a buffer stage, comprising a first transistor Q1 and resistor R0. The output of the series connection of the diodes D1, D2 and the capacitor C1 is connected to the emitter of a second transistor Q2. The emitter of the second transistor Q2 is connected via third resistor R3 to a reference voltage source V1, which can be ground level. A first resistor R1 is connected between the collector and the base of the second transistor Q2. A second resistor R2 and a second capacitor C2 are connected in parallel between the base of the second transistor Q2 and the first reference voltage source V1. The collector of the second transistor Q2 is also connected to a second reference voltage source V2 via a fourth resistor R4. A series connection of another capacitor C3 and another diode circuit, including at least a third diode D3 and a fourth diode D4, is connected Parallel to the fourth resistor R4. The third diode D3 and fourth diode D4 may be connected anti-parallel, while an anode of one of these diodes D3; D4 may be connected to the cathode of the other diode D4; D3. Alternatively, each diode D3; D4 might be realized by connecting two diodes in series D3, D5; D4, D6. A further alternative is to use two zener diodes D3, D4 depending on the desired voltage range. Still further alternatives are possible, such as combinations of the mentioned diode circuits. At the collector of the second transistor Q2, the modulation signal DS is present for driving the converter 14.

The unit 1 operates as follows. At the positive excursions of the video signal VS, a forward current flows through the first diode D1 and capacitor C1 to the resistor R3. During a subsequent negative going excursion, a reverse current starts flowing from the emitter of the first transistor Q1 via second diode D2 and first capacitor C1 towards the input of the unit 1, when the video signal VS has dropped by an amount equal to the sum of the forward voltages of the first diode D1 and second diode D2. At the next positive excursion, the forward current starts to flow again, when the positive excursion again exceeds the sum of the forward voltages. Diodes usually have a forward voltage of about 0.7 V, so the sum of the forward voltages is about 1.4 V. The result is that only excursions of the video signal VS, which are at least 0.7 V above a reference value or at least 0.7V below the reference value, are passed on to the emitter of the second transistor Q2. In this way, the desired coring is obtained. The capacitor C1, receiving at one terminal via the coring circuit the video signal VS from a low output impedance voltage source, and having its other terminal connected to a low input impedance input of an amplifier, provides the differentiation.

The second transistor Q2 is arranged as an amplifier with a feedback arrangement comprising the first resistor R1, the second resistor R2 and the second capacitor C2. Such an arrangement is well known, and will therefore not be further elucidated. The excursions of the output signal of the amplifier, present at the collector of the second transistor Q2, are limited by the series connection of the other capacitor C3 and the other diode circuit comprising, for example, two anti-parallel connected diodes D3, D4. If an excursion of this output signal exceeds the forward voltage of the concerned one of the two diodes D3; D4, this diode D3; D4 starts to conduct, thereby preventing any further excursion of the output signal, being the modulation signal DS. Consequently, the two diodes D3, D4 act as a limiter circuit, limiting the output voltage swing to the sum of the forward voltages of the two diodes D3, D4.

In the above example, the swing is approximately 1.4 V. If a larger swing is desired, more than one diode can be connected in series, as shown in FIG. 4. Alternatively, the two diodes can be replaced by zener diodes having a zener voltage corresponding to the desired swing.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. Use of the article "a" or "an" preceding an element or steps does not exclude the presence of a plurality of such elements or steps. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A processing unit (1) for generating a scan velocity modulation signal (DS), the processing unit having an input for receiving a video signal (VS), and an output for supplying the modulation signal (DS), characterized in that the processing unit comprises, successively from the input to the output, a coring circuit (C), a differentiator (D), and a limiter (L).

2. A processing unit (1) as claimed in claim 1, characterized in that the coring circuit (C) comprises a diode circuit, having a first diode (D1) and a second diode (D2) coupled anti-parallel, a cathode of the first diode (D1) being coupled to an anode of the second diode (D2).

3. A processing unit (1) as claimed in claim 2, characterized in that the differentiator (D) comprises:
 a first capacitor (C1), which is coupled in series with the diode circuit (D1, D2).

4. A processing unit (1) as claimed in claim 3, characterized in that an amplifier (Q2, R1, R2, R3, R4) is present having a positive input coupled to an output of the coring circuit (C).

5. A processing unit (1) as claimed in claim 4, characterized in that the amplifier (Q2, R1, R2, R3, R4) has a transistor (Q2) having a control terminal corresponding to a negative input of the amplifier (Q2, R1, R2, R3, R4), a first main terminal as the positive input, and a second main terminal as an amplifier output.

6. A processing unit (1) as claimed in claim 5, characterized in that the limiter (L) comprises a series connection of another capacitor (C3) and another diode circuit comprising a third diode (D3) and a fourth diode (D4), the series connection being coupled between a second reference voltage source (V2) and the amplifier output.

7. A processing unit (1) as claimed in claim 6, characterized in that the third (D3) and the fourth diode (D4) are zener diodes coupled anti-parallel.

8. A display device (16) comprising a cathode ray tube (10) having a processing unit (1) as claimed in claim 1 for generating a scan velocity modulation signal (DS); and means (12) for modulating a scan velocity of an electron beam coupled to the output of the unit (1).

9. A display device (16) as claimed in claim 8, characterized in that a converter (14) is present for converting the modulation signal (DS) into a drive current for driving the means (12) for modulating the scan velocity, the converter (14) having an input which is coupled to the output of the unit (1), and an output which is coupled to the means (12) for modulating the scan velocity.

10. A method of generating a scan velocity modulation signal (DS) wherein a video signal (VS) is subjected to the successive steps of:
 coring;
 differentiating; and
 limiting an amplitude of the video signal (VS).

* * * * *